United States Patent [19]

Priegnitz

[11] 3,843,908
[45] Oct. 22, 1974

[54] VOLTAGE FAILURE SENSING CIRCUIT
[75] Inventor: Robert A. Priegnitz, Crystal Lake, Ill.
[73] Assignee: Coilcraft Inc., Cary, Ill.
[22] Filed: Dec. 3, 1973
[21] Appl. No.: 421,232

[52] U.S. Cl. ............ 317/31, 317/33 R, 317/36 TD, 317/47
[51] Int. Cl. ................................................ H02h 3/24
[58] Field of Search...... 317/27 R, 31, 47, 48, 13 R, 317/33 R, 36 TD; 340/248 B; 307/130

[56] References Cited
UNITED STATES PATENTS
3,001,100   9/1961   Schuh et al. .......................... 317/31
3,383,522   5/1968   Apfelbeck et al. .................... 317/31

*Primary Examiner*—James D. Trammell

[57] ABSTRACT

A circuit for sensing voltage failure in a multiphase conductor electric power supply. Voltage failure of any of the phase conductors to a value less than a predetermined voltage serves to de-energize a sensing means, which preferably comprises a solenoid in control circuit relationship with a load connected to the power supply.

19 Claims, 2 Drawing Figures

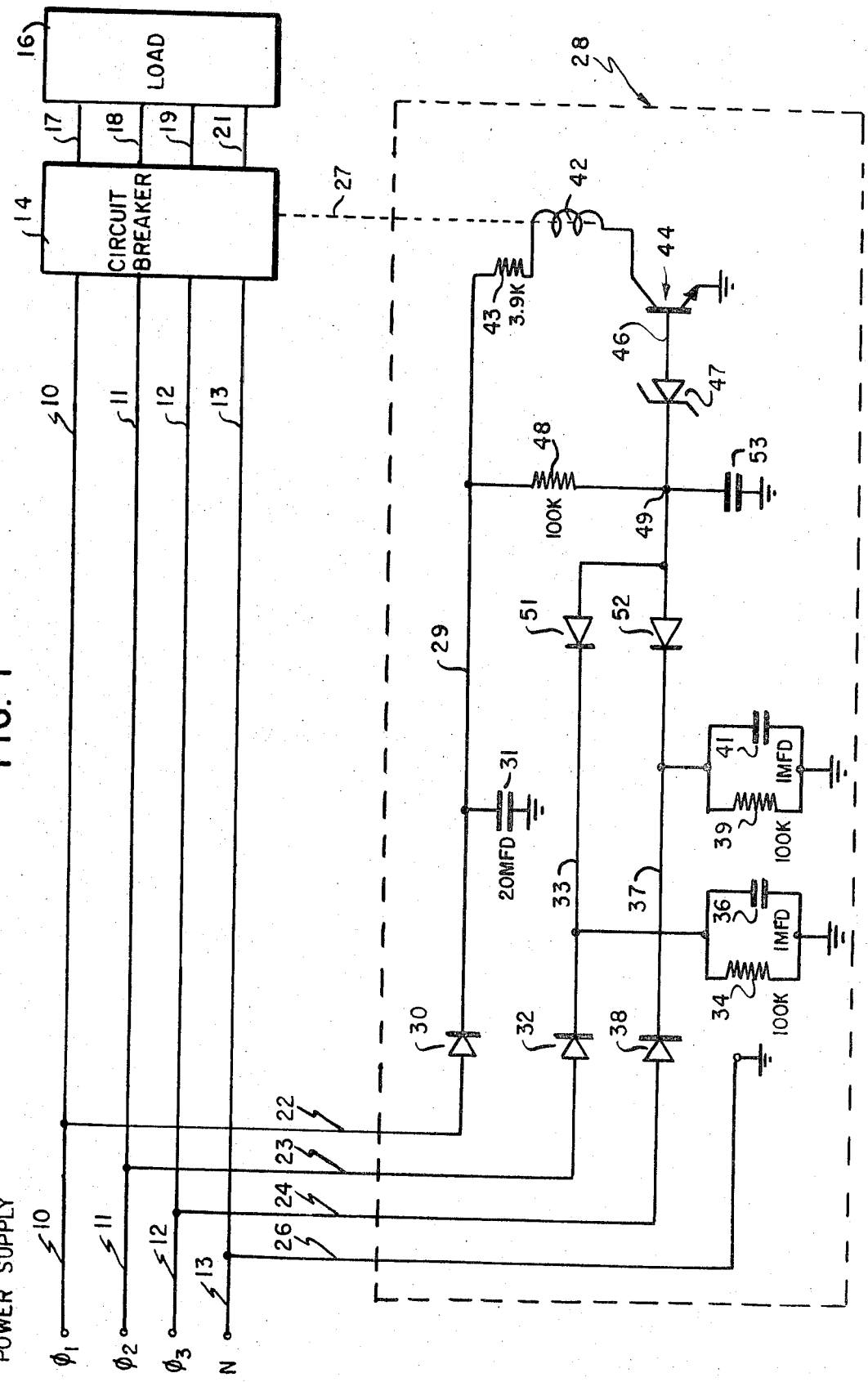

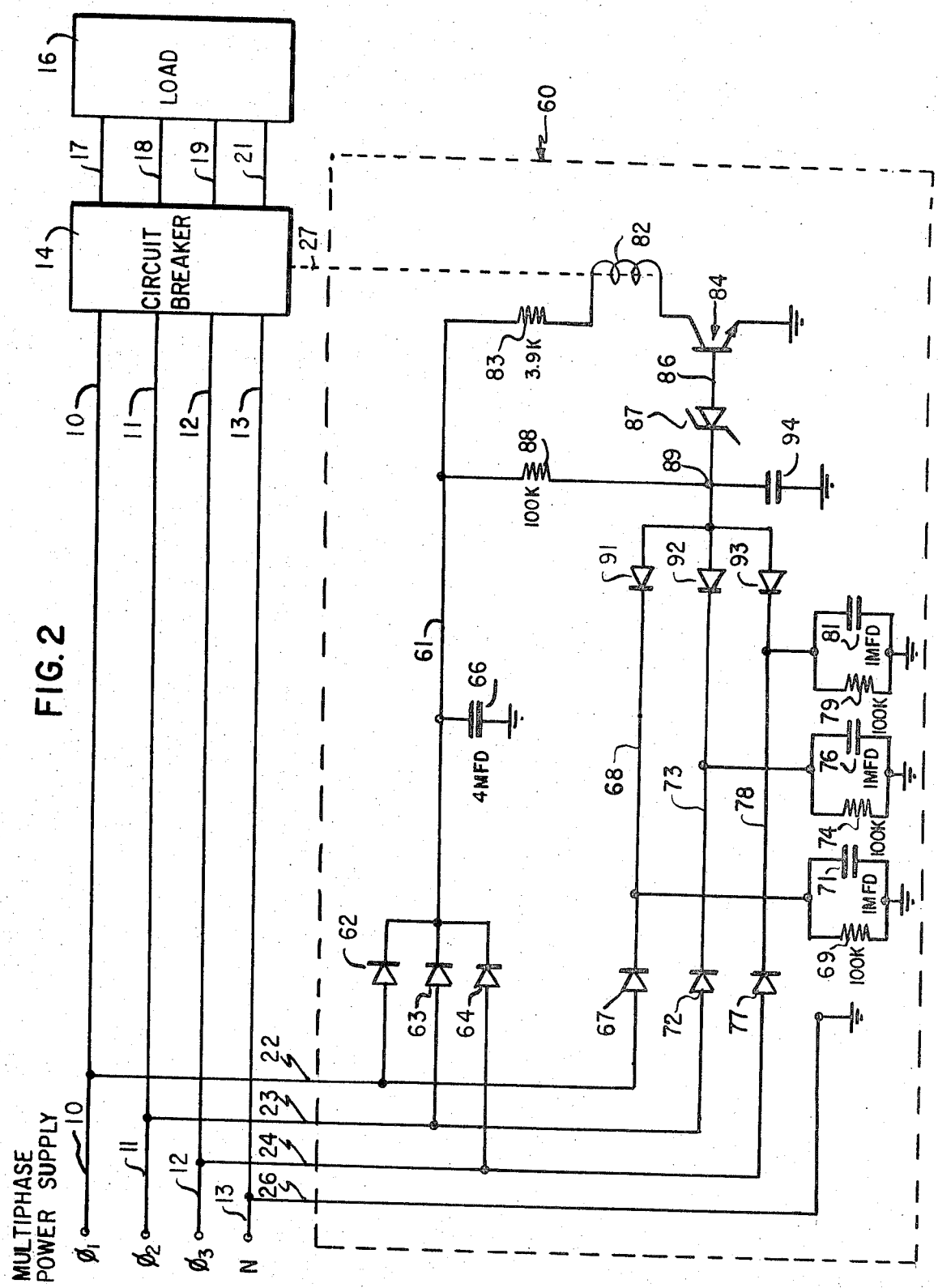

3,843,908

VOLTAGE FAILURE SENSING CIRCUIT

BACKGROUND OF THE INVENTION

1. Field of the Invention

This invention relates in general to protector circuits for use with electric power supply systems and, more particularly, to novel circuits for sensing voltage failure in multi-phase conductor power supplies.

2. Description of the Prior Art

In multi-phase electric power systems, it is well-known that phase voltage failure or unbalance between phase voltages may cause severe damage to connected loads, particularly multi-phase motors. Although a multi-phase motor will continue to operate upon voltage failure of a single phase conductor, such operation frequently results in overheating due to abnormally high currents. In a three-phase system, complete voltage failure of one phase results in a condition commonly known as "single-phasing" which can cause a severe overload of the remaining phase and consequent damage to the motor. Accordingly, it is desirable to sense phase voltage failure or severe phase voltage unbalance immediately and indicate such a condition so that multi-phase loads can be disconnected from the multi-phase power supply to prevent damage.

An example of a voltage balance relay circuit suitable for such purpose is disclosed in Beckwith U.S. Pat. No. 3,648,112, issued on Mar. 7, 1972, and entitled "Voltage Balance Relay circuit". The protective device disclosed therein is a complex electric circuit having a differential amplifier which compares voltages proportional to the maximum and minimum of any of the phase voltages during conditions of voltage unbalance and develops an output voltage proportional to the difference, the output serving to actuate a relay or other indicating device. Although this protective device is reliable, it comprises a complicated electronic circuit which is relatively expensive to manufacture. Furthermore, since it depends on a voltage output to actuate its circuit-breaking function, a failure in the device itself renders the protective function inoperative.

Need has arisen, therefore, for a reliable and fail-safe voltage failure sensing circuit which is of simple design and less expensive to manufacture than circuits similar to that disclosed in the above-mentioned patent.

SUMMARY OF THE INVENTION

The present invention is directed to such an improved device, and ccomprises a reliable and fail-safe voltage failure sensing circuit for a multi-phase conductor power supply which comprises fewer and simpler electronic components than the circuit disclosed in the above-mentioned patent. Voltage failure of any of the phase conductors to a value less than a predetermined voltage serves to de-energize a sensing means, which preferably comprises a solenoid in control circuit relationship with a load connected to the power supply. The circuit further desirably includes a capacitor which is operable until charged to a predetermined voltage to prevent energization of the solenoid or other sensing means upon restoration of full phase conductor voltages; accordingly, a supply circuit to a load can be re-established after a time delay determined by the value of such a capacitor. In a multi-phase power system in which a number of multi-phase loads such as motors are locally connected to a common power supply, it is desirable to provide a separate voltage failure sensing circuit for each load, the sensing circuits having capacitors of unlike values to prevent simultaneous energization of all of the loads upon restoration or application of full phase conductor voltages. Since the instantaneous peak demand is, therefore, limited, resultant savings are incurred both in the sizing of electrical supply equipment and in demand charges customarily payable to electric utilities.

Accordingly, it is an important object of this invention to provide an improved circuit for sensing voltage failure in a multi-phase conductor power supply.

Another important object of this invention is to provide a voltage failure sensing circuit which is reliable and fail-safe.

A still further object of this invention is to provide a voltage failure sensing circuit which is simple in design and inexpensive to manufacture.

Yet another important object of this invention is to provide a time delay in energizing a multi-phase load following restoration or application of full phase conductor voltages.

Numerous other objects and advantages of the invention will be apparent from the following description, which, when taken in conjunction with the accompanying drawings, discloses two preferred embodiments thereof.

BRIEF DESCRIPTION OF THE DRAWINGS

FIG. 1 is a schematic diagram which illustrates the basic features of one preferred embodiment of the circuit of the present invention; and FIG. 2 is a schematic diagram which illustrates an alternate preferred embodiment of the present invention.

DESCRIPTION OF THE PREFERRED EMBODIMENTS

Turning now to the general features of both preferred embodiments of the present invention, reference is made to FIGS. 1 and 2. As shown therein, with common reference numerals, a multi-phase conductor electric power supply is illustrated as a typical three-phase three-wire 120/208 volt rms wye supply over phase conductors or lines 10, 11 and 12, with a neutral being provided on conductor or line 13, the phase-to-neutral or phase voltages being approximately 120 volts, with the phase-to-phase or line voltages being approximately 208 volts. It should be noted that the circuit of the present invention is applicable to a multi-phase conductor power supply having a number of phases greater than three and that the voltages illustrated in the figures correspond to voltages available and utilized in typical power supply systems.

The power supply comprising lines 10, 11, 12 and 13 is connected through a conventional circuit breaker or other circuit interrupting means 14 which, in turn, is connected to a three-phase motor or other load 16 through lines 17, 18, 19 and 21, the load being energized in a well-known manner only when the circuit breaker 14 is in its closed position. The power supply is connected to a voltage failure sensing circuit of the present invention, illustrated within the dotted boxes in FIGS. 1 and 2, by means of conductors or lines 22, 23, 24 and 26.

The present invention generally comprises a circuit for sensing voltage failure or unbalance between phase voltages in the power supply comprising lines 10, 11, 12 and 13. The circuit comprises a sensing means which, as will be described in detail later, is de-energized upon such voltage failure. The sensing means preferably comprises a solenoid in control circuit relationship, represented by the dotted line 27, with the circuit breaker 14 for providing a trip signal for opening the circuit breaker upon voltage failure. The circuit of the present invention is fail-safe as its protective circuit-breaking control function does not require an energized output condition; rather, the solenoid or sensing means is de-energized upon voltage failure. It should be noted that the sensing means can be connected to control a visual display or other indicating device (not shown) in response to such voltage failure.

FIG. 1 illustrates one preferred embodiment of the present invention, the circuit 28 being illustrated within the dotted box in that figure. The circuit 28 comprises a first circuit means connected to one phase conductor 22 for deriving on a line 29 a first DC. voltage corresponding to the maximum phase conductor voltage. The first circuit means comprises a diode 30 and a filter circuit including a capacitor 31 connected between line 29 and ground, the ground terminal being in common with the neutral conductor 26 which is, in turn, connected to line 13 of the power supply. The filter circuit is operable to smooth the ripple output of the half-wave rectifier comprising diode 30 and to eliminate false tripping due to voltage surges or switching transients in a well-known manner. The filter circuit includes a resistance portion (to be described later) in parallel with the capacitor 31. For the illustrated 120/208 volt rms wye three-phase power supply, with the component values illustrated in FIG. 1, the first DC. voltage on line 29 will be approximately 167 volts, the maximum or peak phase conductor voltage. It should be noted, however, that the voltages and component types and values illustrated in the figures are approximate and correspond to voltages and components conveniently available and utilized in a typical working embodiment of the present invention, but operation of the circuits illustrated in the figures is certainly not restricted to the values shown, their selection being a matter of design choice.

The circuit 28 includes second circuit means connected to each of the other phase conductors 23 and 24 for deriving second DC. voltages respectively corresponding to the phase conductor voltages thereof. Each said second circuit means comprises a semiconductor diode connected to a resistor-capacitor filter circuit. Phase conductor 23 is connected through a diode 32 to a line 33 which, in turn, is shunted to ground through the filter circuit comprising a resistor 34 and capacitor 36. Similarly, phase conductor 24 is connected to a line 37 through a diode 38, line 37 being shunted to ground through the filter circuit comprising a resistor 39 and a capacitor 41. Each of the foregoing parallel resistor-capacitor filter circuits serves to smooth the rectified phase voltage and, in addition, provides a path to ground for voltage surges or switching transients appearing on the phase conductor in a manner identical with the previously described filter circuit. The second DC. voltages on line 33 and 37 will have magnitudes of approximately 167 volts for the illustrated component values.

Circuit 28 comprises a solenoid or other sensing means 42 connected to the first voltage on line 29 through a resistor 43 which serves to limit the current through the solenoid, which, in the preferred embodiment illustrated, is a conventional 120 volt solenoid having a resistance of about 10 K ohms. The circuit 28 further includes an NPN type transistor or other electronic switching means 44 having a base or control element 46, the transistor 44 having a collector connected to the solenoid 42 and an emitter connected to ground. The solenoid 42 is energized upon application of the first voltage on line 29 thereto when the transistor 44 is in its conductive or saturated state. For that condition, the resistance portion of the filter circuit of the first circuit means comprises the resistance of the solenoid 42 in series with resistor 43, neglecting any resistance of the transistor 44. Transistor 44 is of the NPN type corresponding to the illustrated diode polarities.

Circuit 28 comprises a first gating means or zener diode 47 having an anode terminal thereof connected to the base 46 of the transistor 44, the zener diode 47 being conductive upon application of a predetermined voltage thereto in a well-known manner. In the embodiment illustrated, the zener diode 47 becomes conductive when reversely biased by a voltage of 140 volts, that is, when its cathode is at a potential of plus 140 volts with respect to its anode.

The circuit 28 further comprises a resistor or biasing means 48 connected between said first voltage on line 29 and a terminal 49 at the cathode of the zener diode 47 for conductively biasing the transistor 44 by providing a current to its base 46 through the zener diode 47 upon conduction of the latter when said first voltage on line 29 exceeds said predetermined voltage of 140 volts.

The circuit 28 further includes second gating means comprising diodes 51 and 52 respectively connecting lines 33 and 37 to the terminal 49.

The operation of the circuit 28 will now be described in detail. The first circuit means comprising diode 30 and its associated filter circuit derives a first DC. voltage on line 29 of approximately 167 volts corresponding to the maximum or peak voltage of the phase conductor 22, as described earlier. The second circuit means connected to each of the other phase conductors 23 and 24 derives second DC. voltages of approximately 167 volts on lines 33 and 37 respectively corresponding to the phase voltages on phase conductors 23 and 24. Under normal conditions during which phase conductors 22, 23 and 24 are at full phase voltages, the zener diode 47 becomes reversely biased by a potential of 140 volts and conducts, thereby allowing resistor 48 to provide bias current from line 29 through the zener diode 47 to the base 46 of transistor 44. It should be noted that the voltage at terminal 49 is the sum of the voltage across the zener diode 47 and the base-emitter voltage of transistor 44 (the latter being approximately 0.6 volt). The voltage drop across resistor 48 will normally be approximately 27 volts. Since the collector of transistor 44 is sufficiently positive with respect to its grounded emitter, transistor 44 is normally conductive, thereby energizing the solenoid 42 in its collector circuit. Since the voltage at terminal 49 is at a potential of 140 volts with respect to ground, diodes 51 and 52 are reversely biased through diodes 32 and 38 and hence nonconductive.

Under a condition of phase voltage failure or voltage unbalance between the phase conductors wherein phase voltage on one or more of the phase conductors 22, 23 and 24 decreases below the predetermined voltage of 140 volts peak or approximately 85 percent of the maximum phase conductor voltage, bias to the base 46 of transistor 44 will be interrupted, thereby rendering transistor 44 nonconductive to de-energize solenoid 42. Should the voltage on phase conductor 22 decrease below or approach approximately 140 volts peak, the voltage at terminal 49 will correspondingly decrease below 140 volts with the result that zener diode 47 will become nonconductive, thereby interrupting bias to transistor 44. The voltage on conductor 22 which will result in de-energization of the sensing means 42 will depend upon the component values and types, including the characteristics of the transistor 44 and the value of the resistor 48. For the illustrated component values, the solenoid will be de-energized when the voltage on conductor 22 drops to a voltage ranging from 150 volts peak and lower. The smaller the voltage drop across resistor 48, the lower the voltage on conductor 22 can become without de-energizing the solenoid 42.

Should the phase voltage on either of the phase conductors 23 or 24 decrease below approximately 140 volts peak, assuming that the phase voltage of phase conductor 22 is sufficient to cause the zener diode 47 to conduct, one of the diodes 51 or 52 will become conductive when the said second voltage on either line 33 or 37 derived thereto decreases below 140 volts, conduction of one of the diodes 51 or 52 serving to decrease the potential at the terminal 49 to a value below approximately 140 volts for rendering the zener diode 47 non-conductive. For example, should the voltage on line 23 decrease below 140 volts peak, the DC. voltage derived on line 33 will correspondingly decrease below 140 volts with the result that diode 51 will become forwardly biased and hence conductive, its anode being positive with respect to its cathode. When diode 51 becomes conductive, the voltage the terminal 49 will decrease below 140 volts with the result that the zener diode 47 will become nonconductive, thereby interrupting bias to the base 46 of transistor 44.

It should be noted that notwithstanding complete loss of voltage on either of the phase conductors 23 or 24, the minimum voltage on line 33 or 37 will be approximately one-half of the voltage on line 29 or approximately 83.5 volts, assuming full voltage on phase conductor 22, due to the voltage divider comprising resistor 48 and either resistor 34 or 39. For example, should the voltage on phase conductor 23 decrease to zero with full voltage appearing on phase conductor 22, terminal 49 and line 33 will assume a voltage of approximately 83.5 volts, as the 167 volt potential on line 29 will be divided by operation of the voltage divider comprising the equal resistors 48 and 34.

The circuit 28 further comprises a capacitor 53 connected between the cathode of the zener diode 47 and ground. After a voltage failure or loss has occurred with resultant de-energization of the solenoid 42, upon restoration of full phase conductor voltages, capacitor 53 will prevent conduction of the zener diode 47 until terminal 49 is charged to approximately 140 volts. It is apparent that upon full voltage restoration or application the solenoid 42 will be energized after a time delay determined by the value of capacitor 53. In a multi-phase power system in which a number of multi-phase loads such as motors are locally connected to common power supply, it is desirable to provide a separate circuit 28 in control circuit relationship with each multi-phase load, each such circuit 28 having a capacitor 53 of a different value. Although each circuit 28 will simultaneously respond to a phase voltage failure to open the supply circuit to its corresponding load, upon restoration or application of full phase conductor voltages, each circuit 28 will serve to energize its associated load after a different time delay determined in accordance with the unique value of its associated capacitor 51. Selection of unlike values for each capacitor 53 will prevent simultaneous energization of all of the loads and hence limit the instantaneous peak demand upon application of full phase conductor voltages.

FIG. 2 illustrates an alternate preferred embodiment of the present invention, the circuit 60 being illustrated within the dotted box in that figure. The circuit 60 comprises a first circuit means connected to the phase conductors 22, 23 and 24 for deriving a first DC. voltage on a line 61 corresponding to the maximum phase conductor voltage. The first circuit means comprises diodes 62, 63 and 64 respectively connected to conductors 22, 23 and 24 and a filter circuit including a capacitor 66 connected between line 61 and ground, the ground terminal being in common with the neutral conductor 26. The filter circuit is operable to smooth the ripple output of the half-wave rectifiers comprising diodes 62, 63 and 64 in a well-known manner. For the illustrated three-phase 120/208 volt rms wye power supply, with the component values illustrated, the first DC. voltage on line 61 will be approximately 167 volts, the maximum or peak phase conductor voltage, assuming that at least one of the phase conductors 22, 23 or 24 is at full phase voltage. It should be noted that the capacitor 66 is of a smaller value than capacitor 31 of circuit 28; however, circuit 60 requires four more diodes than circuit 28, as will be presently described.

The circuit 60 includes second circuit means connected to each of the phase conductors 22, 23 and 24 for deriving second D.C. voltages respectively corresponding to the phase conductor voltages thereof, each said second circuit means comprising a semiconductor diode connected to a resistor-capacitor filter circuit. Phase conductor 22 is connected through a diode 67 to a line 68 which, in turn, is shunted to ground through the filter circuit comprising a resistor 69 and a capacitor 71. Phase conductor 23 is similarly connected through a diode 72 to a line 73 which, in turn, is shunted to ground through the filter circuit comprising a resistor 74 and a capacitor 76. Likewise, phase conductor 24 is connected through a diode 77 to a line 78 which, in turn, is shunted to ground through the filter circuit comprising a resistor 79 and a capacitor 81. The second DC. voltages on lines 68, 73 and 78 will have magnitudes of approximately 167 volts for the illustrated component values. Each foregoing parallel resistor-capacitor filter circuit serves to smooth the rectified phase voltage and, in addition, provides a path to ground for voltage surges or switching transients in a manner identical to that described earlier with respect to the filter circuits in circuit 28 of FIG. 1.

As in circuit 28 of FIG. 1, circuit 60 comprises a solenoid or other sensing means 82 connected to the first voltage on line 61 through a resistor 83 which serves to limit the current through the solenoid. The circuit 60 further includes an NPN transistor or other electronic switching means 84 having a base or control element 86, the transistor 84 having a collector connected to the solenoid 82 and an emitter connected to ground. The solenoid 82 is energized upon application of the first voltage on line 61 thereto when the transistor 84 is conductive. For that condition, the resistance portion of the filter circuit of the first circuit means comprises the combined resistance of the solenoid 82 and the resistor 83, neglecting any resistance of the transistor 84. Transistor 84 is of the NPN type corresponding to the illustrated diode polarities.

Circuit 60 comprises a first gating means or zener diode 87 having an anode terminal thereof connected to the base 86 of the transistor 84, the zener diode 87 being conductive upon application of a predetermined voltage of approximately 140 volts thereto, in a manner identical to that described earlier.

The circuit 60 further comprises a resistor or biasing means 88 connected between line 61 and a terminal 89 at the cathode of the zener diode 87 for conductively biasing the transistor 84 by providing a current to its base 86 through the zener diode 87 upon conduction of the latter when said first voltage on line 61 exceeds said predetermined voltage of 140 volts.

The circuit 60 further includes second gating means comprising diodes 91, 92 and 93 respectively connecting lines 68, 73 and 78 to the terminal 89.

The operation of the circuit 60 is quite similar to that of circuit 28. As noted earlier, the first circuit means derives a first DC. voltage on line 61 of approximately 167 volts corresponding to the maximum or peak phase conductor voltage. The second circuit means connected to each of the phase conductors derives second DC. voltages on lines 68, 73 and 78 of approximately 167 volts respectively corresponding to the phase voltages on phase conductors 22, 23 and 24. Assuming that the phase conductors 22, 23 and 24 are at full phase voltage, the zener diode 87 becomes reversely biased by a potential of approximately 140 volts and conducts, thereby allowing resistor 88 to provide bias current from line 61 through the zener diode 87 to the base 86 of transistor 84. In a manner similar to that described earlier with respect to the circuit 28 of FIG. 1, transistor 84 is normally conductive, thereby energizing the solenoid 82 in its collector circuit. Under normal conditions diodes 91, 92 and 93 are reversely biased and hence nonconductive.

Under a condition of phase voltage failure or voltage unbalance between the phase conductors wherein phase voltage on one or more of the phase conductors 22, 23 and 24 decreases below the predetermined voltage of approximately 140 volts peak, bias to the base 86 of transistor 84 is interrupted, thereby rendering transistor 64 nonconductive to de-energize solenoid 82. Should the voltage, for example, on phase conductor 23 decrease below about 140 volts peak, assuming that the phase voltage of one of the other phase conductors is otherwise sufficient to cause the zener diode 87 to conduct, diode 92 will become conductive when the said second voltage on line 73 derived thereto decreases below 140 volts, conduction of diode 92 serving to decrease the potential at the terminal 89 to a value below approximately 140 volts for rendering the zener diode 47 nonconductive, thereby interrupting bias to the base 86 of transistor 84.

As described earlier with respect to the circuit illustrated in FIG. 1, the minimum voltage on line 68, 73 or 78 will be approximately one-half of the value of the voltage on line 61, or 83.5 volts, due to the voltage divider comprising resistor 88 and the resistor in the associated filter circuit.

The circuit 60 further comprises a capacitor 94 connected between the cathode of the zener diode 87 and ground for a purpose identical as that described earlier with respect to circuit 28. After a voltage failure has occurred with resultant de-energization of the solenoid 82, upon restoration of full phase conductor voltages, capacitor 94 will prevent conduction of the zener diode 87 until terminal 89 is charged to approximately 140 volts. It is apparent that upon full voltage restoration the solenoid 82 will be energized after a time delay determined by the value of capacitor 94. Separate circuits 60 with capacitors 94 having unlike values will limit the peak demand upon application or restoration of full phase conductor voltages, as described earlier.

It is thought that the invention and many of its attendant advantages will be understood from the foregoing description, and it is apparent that various changes may be made in the form, construction and arrangement of its component parts without departing from the spirit and scope of the invention or sacrificing all of its material advantages, the forms described being merely preferred embodiments thereof.

I claim:

1. A circuit for sensing voltage failure in a multiphase conductor power supply comprising: first circuit means connected to at least one of the phase conductors for deriving a first DC. voltage corresponding to the maximum phase conductor voltage; second circuit means connected to certain of the phase conductors for deriving second DC. voltages respectively corresponding to the phase conductor voltages thereof; sensing means in circuit with said first voltage; electronic switching means having a control element, said switching means being in series circuit with said sensing means and ground, said sensing means being energized upon application of said first voltage thereto when said switching means is conductive; first gating means in circuit with said control element, said first gating means being conductive upon application of a predetermined voltage thereto; biasing means in circuit with said first voltage and said first gating means for conductively biasing said switching means through said first gating means upon conduction of the latter when said first voltage exceeds said predetermined voltage; and second gating means connecting each said second circuit means to said first gating means, each said second gating means being conductive when the said second voltage derived thereto decreases to a value below said predetermined voltage, conduction of a said second gating means serving to decrease the voltage on said first gating means to said value for rendering the latter non-conductive, thereby interrupting the bias to said switching means; whereby voltage failure of any of the phase conductors to a value less than said predetermined voltage serves to interrupt bias to said switching means to de-energize said sensing means.

2. A circuit for sensing voltage failure in a multiphase conductor power supply comprising: first circuit means connected to one of the phase conductors for deriving a first DC. voltage corresponding to the maximum phase conductor voltage; second circuit means connected to each of the other phase conductors for deriving second DC. voltages respectively corresponding to the phase conductor voltages thereof, sensing means in circuit with said first voltage; electronic switching means having a control element, said switching means being in series circuit with said sensing means and ground, said sensing means being energized upon application of said first voltage thereto when said switching means is conductive; first gating means in circuit with said control element, said first gating means being conductive upon application of a predetermined voltage thereto; biasing means in circuit with said first voltage and said first gating means for conductively biasing said switching means through said first gating means upon conduction of the latter when said first voltage exceeds said predetermined voltage; and second gating means connecting each said second circuit means to said first gating means, each said second gating means being conductive when the said second voltage derived thereto decreases to a value below said predetermined voltage, conduction of a said second gating means serving to decrease the voltage on said first gating means to said value for rendering the latter non-conductive, thereby interrupting the bias to said switching means; whereby voltage failure of any of the phase conductors to a value less than said predetermined voltage serves to interrupt bias to said switching means to de-energize said sensing means.

3. The invention of claim 1, wherein said sensing means is a solenoid in control circuit relationship with a multi-phase load connected to the power supply.

4. The invention of claim 1, wherein said first circuit means comprises a semiconductor diode connected to a filter circuit.

5. The invention of claim 1 wherein each said second circuit means comprises a semiconductor diode connected to a resistor-capacitor filter circuit connected to ground.

6. The invention of claim 1, wherein said electronic switching means comprises a transistor.

7. The invention of claim 1, wherein said first gating means comprises a zener diode.

8. The invention of claim 1, wherein said biasing means comprises a resistor.

9. The invention of claim 1, wherein each said second gating means comprises a semiconductor diode.

10. The invention of claim 1 and a capacitor in circuit with said first gating means and ground, said capacitor being operable until charged to said predetermined voltage to prevent conduction of said first gating means upon restoration of full phase conductor voltages; whereby said sensing means is energized upon said voltage restoration after a time delay determined by the value of said capacitor.

11. A circuit for sensing voltage failure in a multi-phase conductor power supply comprising: first circuit means connected to the phase conductors for deriving a first DC. voltage corresponding to the maximum phase conductor voltage; second circuit means connected to each of the phase conductors for deriving second DC. voltages respectively corresponding to the phase conductor voltages thereof; sensing means in circuit with said first voltage; electronic switching means having a control element, said switching means being in series circuit with said sensing means and ground, said sensing means being energized upon application of said first voltage thereto when said switching means is conductive; first gating means in circuit with said control element, said first gating means being conductive upon application of a predetermined voltage thereto, biasing means in circuit with said first voltage and said first gating means for conductively biasing said switching means through said first gating means upon conduction of the latter when said first voltage exceeds said predetermined voltage; and second gating means connecting each said second circuit means to said first gating means, each said second gating means being conductive when the said second voltage derived thereto decreases to a value below said predetermined voltage, conduction of a said second gating means serving to decrease the voltage on said first gating means to said valve for rendering the latter non-conductive, thereby interrupting the bias to said switching means; whereby voltage failure of any of the phase conductors to a value less than said predetermined voltage serves to interrupt bias to said switching means to de-energize said sensing means.

12. The invention of claim 11, wherein said sensing means is a solenoid in control circuit relationship with a multi-phase load connected to the power supply.

13. The invention of claim 11, wherein said first circuit means comprises three semiconductor diodes connected to a filter circuit.

14. The invention of claim 11, wherein each said second circuit means comprises a semiconductor diode connected to a resistor-capacitor filter circuit connected to ground.

15. The invention of claim 11, wherein said electronic switching means comprises a transistor.

16. The invention of claim 11, wherein said first gating means comprises a zener diode.

17. The invention of claim 11, wherein said biasing means comprises a resistor.

18. The invention of claim 11 wherein each said second gating means comprises a semiconductor diode.

19. The invention of claim 11 and a capacitor in circuit with said first gating means and ground, said capacitor being operable until charged to said predetermined voltage to prevent conduction of said first gating means upon restoration of full phase conductor voltages; whereby said sensing means is energized upon said voltage restoration after a time delay determined by the value of said capacitor.

* * * * *

O-1050
5/69)

UNITED STATES PATENT OFFICE
CERTIFICATE OF CORRECTION

Patent No. 3,843,908     Dated October 22, 1974

Inventor(s) Robert A. Priegnitz

It is certified that error appears in the above-identified patent and that said Letters Patent are hereby corrected as shown below:

Column 6, line 12, "51" should be --53--.

Column 7, line 55, "64" should be --84--.

Signed and sealed this 7th day of January 1975.

(SEAL)
Attest:

McCOY M. GIBSON JR.　　　　　　C. MARSHALL DANN
Attesting Officer　　　　　　　Commissioner of Patents